United States Patent
Liao

(10) Patent No.: US 11,795,746 B2
(45) Date of Patent: Oct. 24, 2023

(54) PIVOT ASSEMBLY AND ELECTRONIC DEVICE INCLUDING THE PIVOT ASSEMBLY

(71) Applicant: Cheng Uei Precision Industry Co., Ltd., New Taipei (TW)

(72) Inventor: Yi Ping Liao, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 560 days.

(21) Appl. No.: 17/123,161

(22) Filed: Dec. 16, 2020

(65) Prior Publication Data
US 2021/0246696 A1    Aug. 12, 2021

Related U.S. Application Data

(60) Provisional application No. 62/971,400, filed on Feb. 7, 2020.

(51) Int. Cl.
| | | |
|---|---|---|
| *E05D 7/10* | (2006.01) | |
| *E05D 5/14* | (2006.01) | |
| *H04R 1/10* | (2006.01) | |
| *H02J 7/00* | (2006.01) | |
| *E05D 3/12* | (2006.01) | |

(52) U.S. Cl.
CPC .............. *E05D 7/1011* (2013.01); *E05D 3/12* (2013.01); *E05D 5/14* (2013.01); *H02J 7/0045* (2013.01); *H04R 1/1016* (2013.01); *H04R 1/1025* (2013.01); *H04R 1/1041* (2013.01); *H04R 1/1075* (2013.01); *E05Y 2900/606* (2013.01); *H04R 2420/07* (2013.01)

(58) Field of Classification Search
CPC .. E05D 5/10; E05D 5/12; E05D 5/125; E05D 5/127; E05D 5/14; E05D 5/16; E05D 2005/102; E05D 2005/145; E05D 3/06; E05D 7/1061; E05D 7/1066; E05D 7/1083; E05D 7/125; E05D 2007/128; E05D 3/02; E05D 11/087; E05D 2011/088; E05D 7/1011; E05D 3/12; H05K 5/0226; A45C 13/005; A45C 13/007
USPC .................................................. 16/337, 342
See application file for complete search history.

(56) References Cited

U.S. PATENT DOCUMENTS

| | | | | |
|---|---|---|---|---|
| 1,429,416 A | * | 9/1922 | Fade ......................... | E05D 5/10 16/386 |
| 1,440,713 A | * | 1/1923 | Ausbourne ............... | E05D 5/10 16/324 |
| 3,924,293 A | * | 12/1975 | Cain ..................... | E05D 7/1011 16/229 |

(Continued)

*Primary Examiner* — Jeffrey O'Brien
(74) *Attorney, Agent, or Firm* — LIN & ASSOCIATES INTELLECTUAL PROPERTY, INC.

(57) ABSTRACT

A pivot assembly includes a fixing base, a pivot portion, a center shaft, a compression spring and two hollow abrasion proof pieces. The fixing base is equipped with an isolating board defining a fixing hole. The pivot portion defines a pivoting hole in alignment with the fixing hole. The center shaft is inserted into the fixing hole and the pivoting hole. The compression spring is mounted around the center shaft. The two hollow abrasion proof pieces are sleeved around the center shaft. The two abrasion proof pieces are located between the isolating board and the pivot portion. The compression spring is located between the two abrasion proof pieces. An electronic device includes the pivot assembly.

14 Claims, 6 Drawing Sheets

(56) References Cited

U.S. PATENT DOCUMENTS

| | | | | |
|---|---|---|---|---|
| 3,977,044 A * | 8/1976 | Mort | ............. | E05D 7/1011 |
| | | | | 16/380 |
| 5,940,934 A * | 8/1999 | Turner | ............. | E05D 7/1011 |
| | | | | 16/257 |
| 6,813,812 B2 * | 11/2004 | Lu | ............. | G06F 1/1681 |
| | | | | 16/337 |
| 8,752,248 B2 * | 6/2014 | Nakasone | ............. | E05D 7/1011 |
| | | | | 16/337 |
| 10,785,553 B2 * | 9/2020 | Sang | ............. | H01F 7/02 |
| 11,214,998 B2 * | 1/2022 | Patil | ............. | E05D 7/1011 |
| 11,438,679 B2 * | 9/2022 | Liu | ............. | A45C 13/1069 |
| 11,444,471 B2 * | 9/2022 | Chang | ............. | H02J 7/0044 |
| 2015/0020351 A1 * | 1/2015 | Lin | ............. | E05D 11/06 |
| | | | | 16/366 |
| 2021/0391739 A1 * | 12/2021 | Venkatraman | ...... | H02J 7/00712 |
| 2022/0097612 A1 * | 3/2022 | Vemulapati | ............. | E05C 9/10 |
| 2022/0217463 A1 * | 7/2022 | Panecki | ............. | G06F 3/167 |
| 2022/0342457 A1 * | 10/2022 | Kwon | ............. | G06F 1/1681 |
| 2023/0114862 A1 * | 4/2023 | Cai | ............. | H04R 1/1025 |
| | | | | 312/319.2 |

* cited by examiner

PIVOT ASSEMBLY AND ELECTRONIC DEVICE INCLUDING THE PIVOT ASSEMBLY

CROSS-REFERENCE TO RELATED APPLICATION

This application claims the priorities of U.S. provisional patent application No. 62/971,400, filed on Feb. 7, 2020, which is incorporated herewith by reference.

BACKGROUND OF THE INVENTION

1. Field of the Invention

The present invention generally relates to a pivot assembly, and more particularly to a pivot assembly which is miniaturized and is easy to be manufactured, and an electronic device including the pivot assembly.

2. The Related Art

A conventional wireless earphone charging box is a miniaturized electronic device. When the conventional wireless earphone is bought by a user, the conventional wireless earphone charging box is a necessity to provide a storage box and a charging function for the wireless earphone.

However, a size of the conventional wireless earphone charging box is limited, a pivot assembly of the conventional wireless earphone charging box applies a ready-made pivot design which is linear. Moreover, the pivot assembly includes a rotation shaft, and a shaft sleeve surrounding the rotation shaft, a torsion force is a friction force generated by virtue of the rotation shaft rubbing against the shaft sleeve to realize a connection and a rotation, and the shaft sleeve is shown as a ring shape, so an inner diameter of the shaft sleeve is different from an outer diameter of the shaft sleeve, and the friction force is generated by virtue of the rotation shaft interfering with an inner peripheral wall and an outer peripheral wall of the shaft sleeve. As a result, a manufacture precision of the pivot assembly which includes the rotation shaft and the shaft sleeve is required extremely high, and the manufacture precision of the pivot assembly is hardly to be reached for satisfying the user, and correspondingly a cost of the conventional wireless earphone charging box is increased.

Therefore, it is necessary to provide an innovative pivot assembly, and an innovative electronic device including the pivot assembly. It is important to design the innovative pivot assembly which is miniaturized and is easy to be manufactured.

SUMMARY OF THE INVENTION

An object of the present invention is to provide a pivot assembly. The pivot assembly includes a fixing base, a pivot portion, a center shaft, a compression spring and two hollow abrasion proof pieces. The fixing base is equipped with an isolating board. The isolating board defines a fixing hole transversely penetrating through the isolating board. The pivot portion defines a pivoting hole penetrating through an inner surface of the pivot portion. The pivoting hole is in alignment with the fixing hole. The center shaft is inserted into the fixing hole and the pivoting hole. Two opposite end surfaces of the center shaft are parallel to each other. The compression spring is mounted around the center shaft. The compression spring is located between the isolating board and the pivot portion. The two hollow abrasion proof pieces are sleeved around the center shaft. The two abrasion proof pieces are located between the isolating board and the pivot portion. The compression spring is located between the two abrasion proof pieces. Two opposite ends of the compression spring abut against two inner surfaces of the two abrasion proof pieces. Two outer surfaces of the two abrasion proof pieces opposite to the two inner surfaces of the two abrasion proof pieces abut against the isolating board and the pivot portion.

Another object of the present invention is to provide a pivot assembly. The pivot assembly includes a fixing base, two pivot portions, two center shafts, two compression springs and two pairs of abrasion proof pieces. The fixing base is equipped with two isolating boards protruded rearward. Each isolating board defines a fixing hole transversely penetrating through each isolating board. The two pivot portions define two pivoting holes penetrating through inner surfaces of the two pivot portions. The two pivoting holes are in alignment with the two fixing holes of the two isolating boards. The two center shafts pass through the two pivoting holes and the two fixing holes of the fixing base. The two compression springs are mounted around the two center shafts. Each compression spring is located between one isolating board, and one pivot portion adjacent to the one isolating board. The two pairs of the abrasion proof pieces are sleeved around the two center shafts. Each pair of the abrasion proof pieces are located between the one isolating board and the one pivot portion. Each compression spring is located between one pair of the abrasion proof pieces. Two opposite ends of each compression spring abut against two inner surfaces of the one pair of the abrasion proof pieces. Two outer surfaces of the one pair of the abrasion proof pieces opposite to the two inner surfaces of the one pair of the abrasion proof pieces abut against the one isolating board and the one pivot portion.

Another object of the present invention is to provide an electronic device. The electronic device includes a case, a lid alternatively covered to the case or moved away from the case, and a pivot assembly. The pivot assembly is connected between the case and the lid, and the lid is pivoted to the case by virtue of the pivot assembly. The pivot assembly includes a fixing base, two pivot portions, two center shafts, two compression springs and two pairs of abrasion proof pieces. The fixing base is equipped with two isolating boards protruded rearward. Each isolating board defines a fixing hole transversely penetrating through each isolating board. The two pivot portions define two pivoting holes penetrating through inner surfaces of the two pivot portions. The two pivoting holes are in alignment with the two fixing holes of the two isolating boards. The two center shafts pass through the two pivoting holes and the two fixing holes of the fixing base. The two compression springs are mounted around the two center shafts. Each compression spring is located between one isolating board, and one pivot portion adjacent to the one isolating board. The two pairs of abrasion proof pieces are sleeved around the two center shafts. Each pair of the abrasion proof pieces are located between the one isolating board and the one pivot portion. Each compression spring is located between one pair of the abrasion proof pieces. Two opposite ends of each compression spring abut against two inner surfaces of the one pair of the abrasion proof pieces. Two outer surfaces of the one pair of the abrasion proof pieces opposite to the two inner surfaces of the one pair of the abrasion proof pieces abut against the one isolating board and the one pivot portion.

As described above, when the lid is lifted upward from the case or is covered to the case, in order to further avoid a plurality of the abrasion proof pieces from rotating, a cross section of each abrasion proof piece is arranged as is designed as a non-circular shape. Moreover, the plurality of the abrasion proof pieces are U-shaped, top surfaces and bottom surfaces of the plurality of the abrasion proof pieces are parallel, and the top surfaces and the bottom surfaces of the plurality of the abrasion proof pieces abut against inner surfaces of upper walls and lower walls of the two lacking grooves and the two indentations, so that when the two compression springs abut against the plurality of the abrasion proof pieces, and the plurality of the abrasion proof pieces abut against the two pivot portions and the two isolating boards to generate corresponding friction forces among the plurality of the abrasion proof pieces, the two compression springs, the two pivot portions and the two isolating boards, the plurality of the abrasion proof pieces are without rotating. In addition, each abrasion proof piece has an abrasion proof function, and the plurality of the abrasion proof pieces are combined with designs of the two compression springs to form resistances which are the friction forces. As a result, a cost of the pivot assembly is lowered, and the pivot assembly is miniaturized and is easy to be manufactured.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
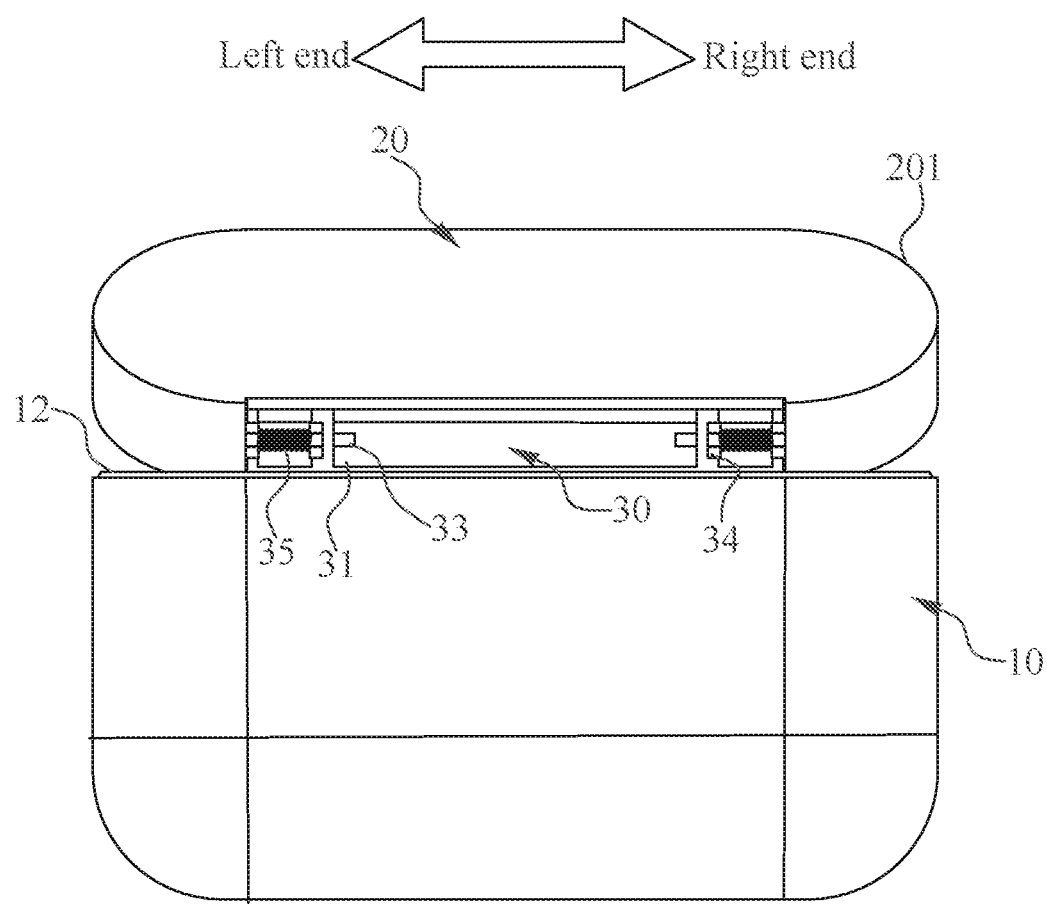
FIG. 1 shows a rear view of a pivot assembly in accordance with a preferred embodiment of the present invention, wherein the pivot assembly is opened and is applied to an electronic device.

Referring to FIG. 1, a pivot assembly 30, and an electronic device 100 including the pivot assembly 30 in accordance with a preferred embodiment of the present invention are shown. The pivot assembly 30 is applied to the electronic device 100. The electronic device 100 includes a case 10 and a hollow lid 20. The lid 20 is alternatively covered to the case 10 to close the case 10 or moved away from the case 10 to open the case 10. The pivot assembly 30 is connected between the case 10 and the lid 20. In the present invention, two opposite ends of the electronic device 100 which are seen from a rear view of the electronic device 100 and arranged transversely are defined as a left end and a right end of the electronic device 100. The lid 20 has a peripheral edge 201 surrounding a circumference of a top surface of the lid 20.

Figure 2:
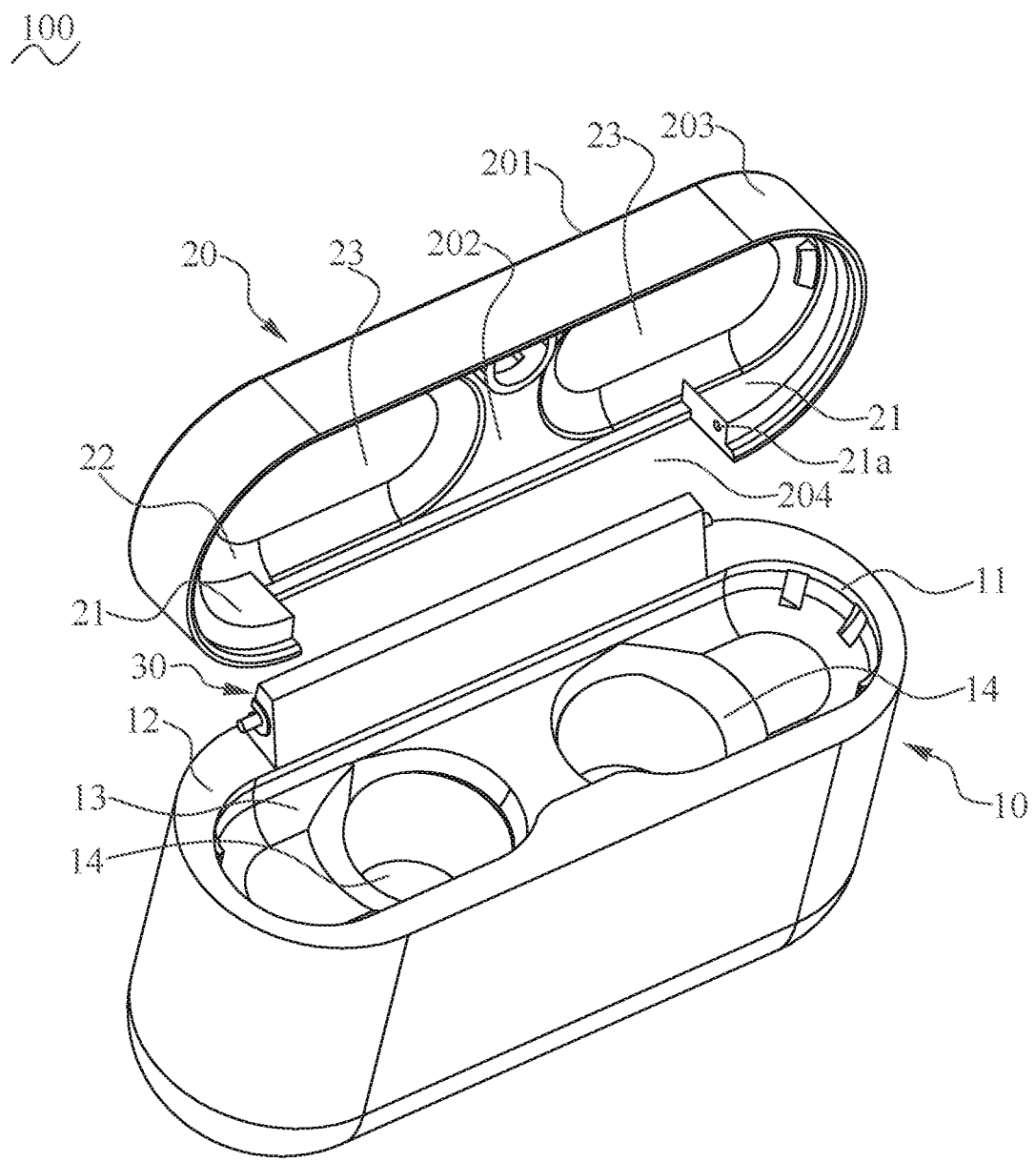
FIG. 2 shows an exploded view of the electronic device of FIG. 1.
Figure 3:
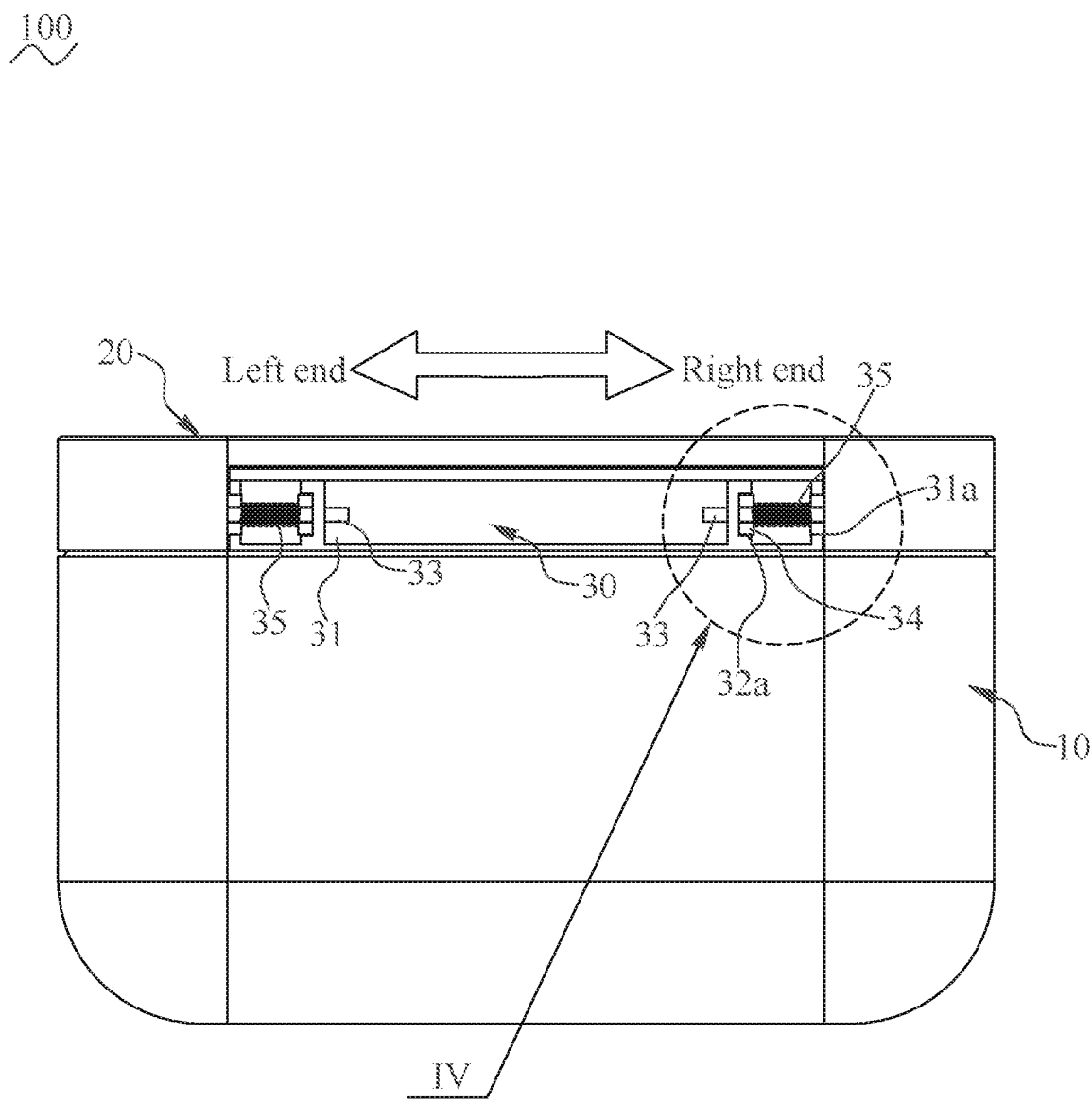
FIG. 3 shows a rear view of the electronic device, wherein the lid is closed and is covered to a case of the electronic device of FIG. 1.
Figure 4:
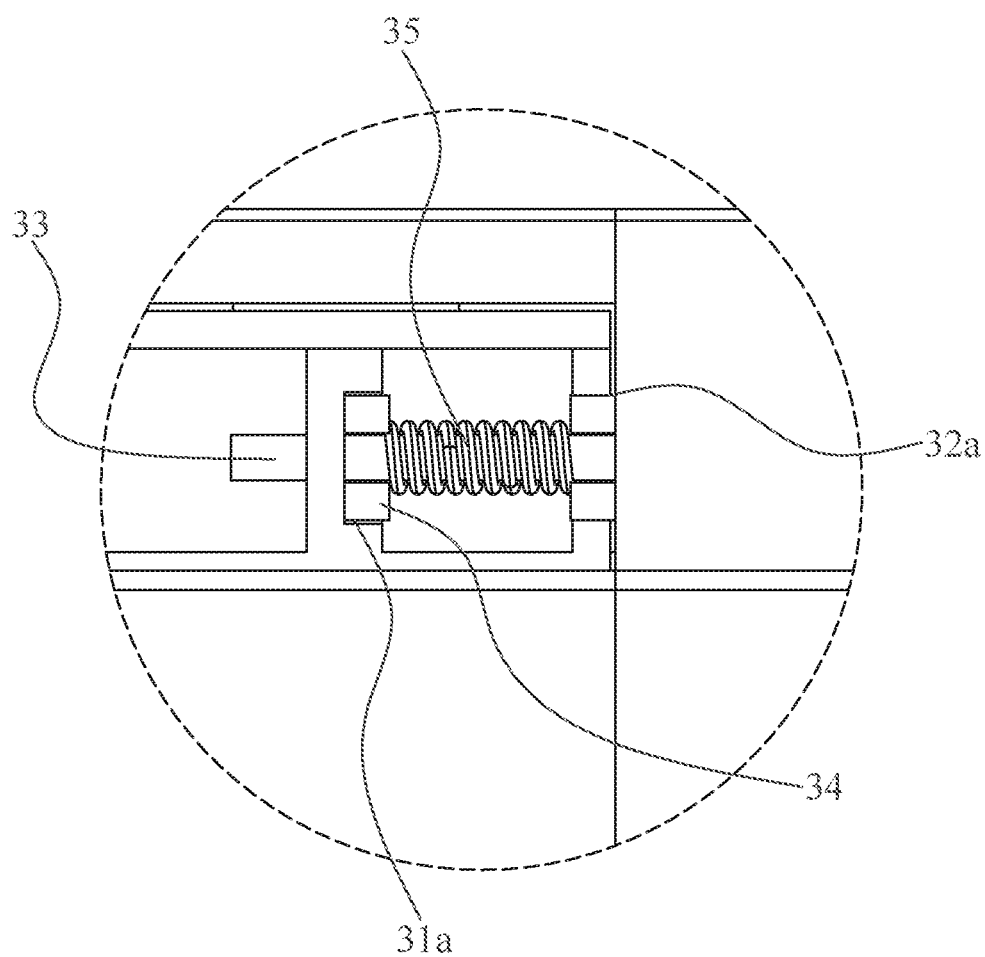
FIG. 4 is an enlarged view of an encircled portion IV of the electronic device of FIG. 3.

Referring to FIG. 1 and FIG. 2, the case 10 has an accommodating space 11 penetrating upward through a top of the case 10. The electronic device 100 further includes an upper fastening holder 22, and a lower fastening holder 13 matched with the upper fastening holder 22. The upper fastening holder 22 defines two upper fastening grooves 23. The lower fastening holder 13 defines two lower fastening grooves 14 matched with the two upper fastening grooves 23. The accommodating space 11 is used for accommodating the lower fastening holder 13 and an electronic product assembly. The lower fastening holder 13 is mounted in the accommodating space 11. A bottom of the lid 20 is opened freely. The upper fastening holder 22 is assembled upward into the lid 20. The case 10 further has an opening 12 penetrating through a top surface of the case 10. The opening 12 is located to and connected to a top of the accommodating space 11. The opening 12 is connected between the accommodating space 11 and an outside space. The lid 20 is pivoted to the case 10 by virtue of the pivot assembly 30. The lid 20 is mounted on a long wall of the opening 12. The pivot assembly 30 is arranged on the long wall of the opening 12 to ensure that the lid 20 is lifted upward from the case 10 or is covered to the case 10 under a balance force, so that the lid 20 is lifted upward from the case 10 or is covered to the case 10 evenly and smoothly, and when the lid 20 is lifted upward, the lid 20 is prevented from affording an uneven force. When the electronic product assembly is placed in the electronic device 100, the lid 20 is covered to the case 10, and the electronic product assembly is fastened in the two upper fastening grooves 23 of the upper fastening holder 22 and the two lower fastening grooves 14 of the lower fastening holder 13.

Figure 5:
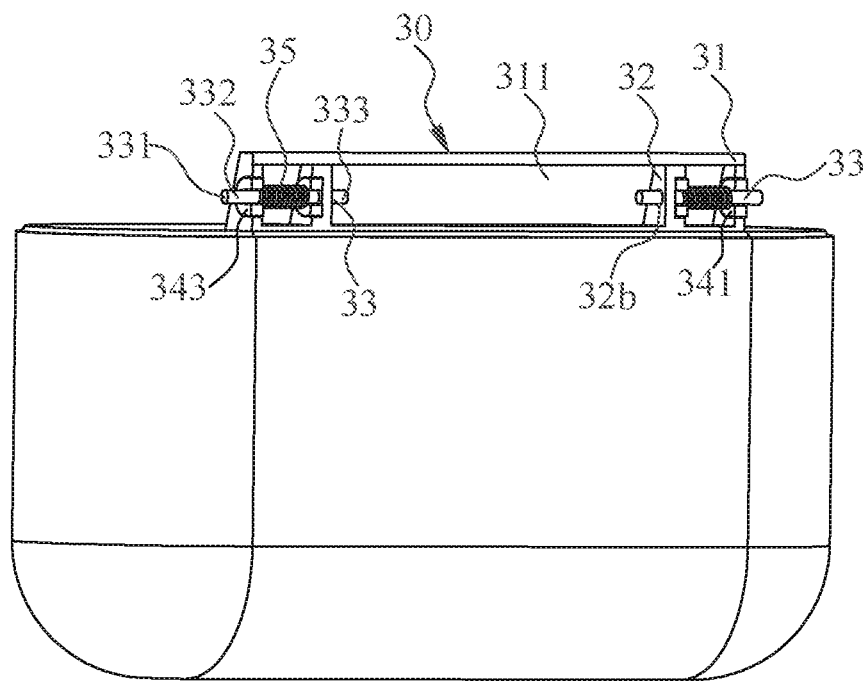
FIG. 5 is a partially perspective view of the electronic device in accordance with the present invention.
Figure 6:
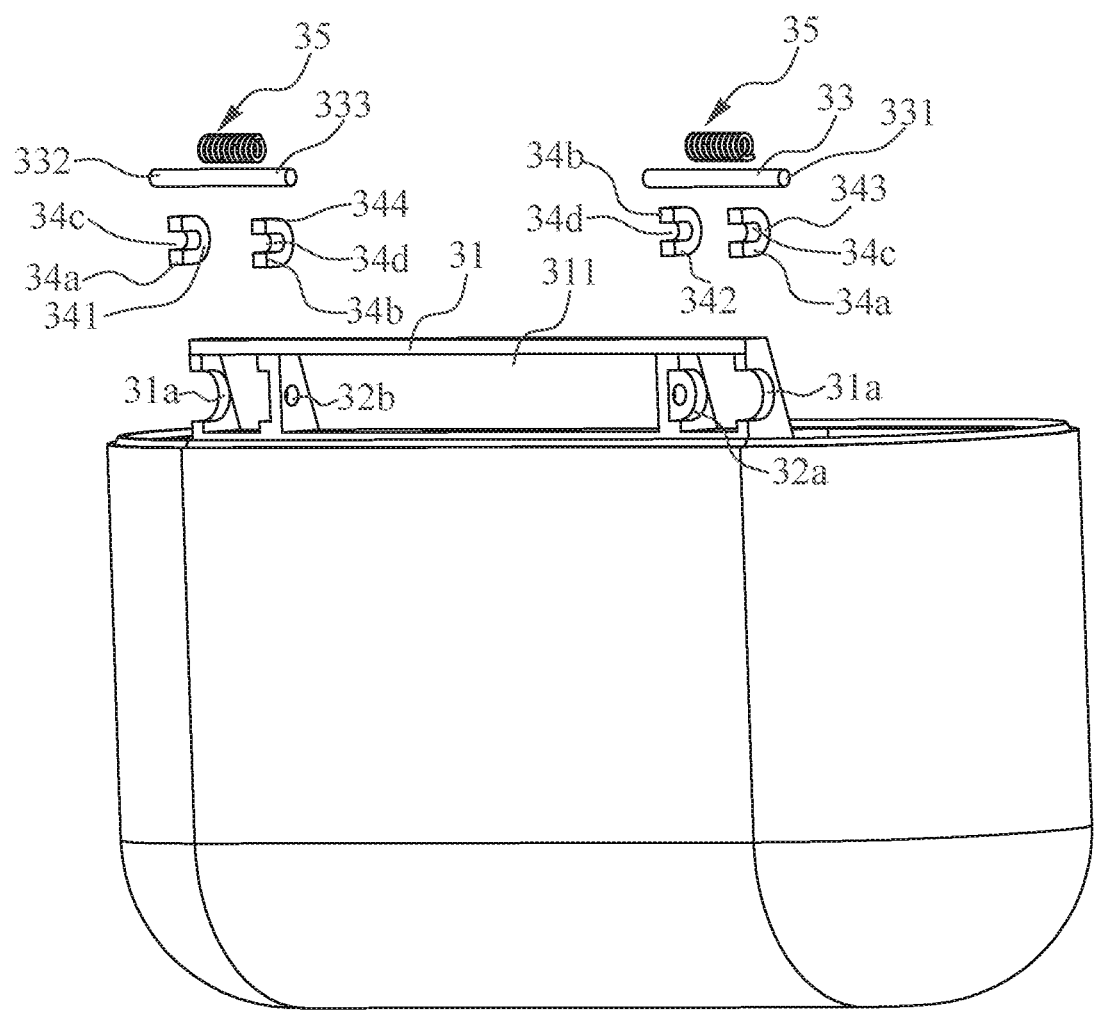
FIG. 6 is a partially exploded view of the electronic device in accordance with the present invention.

Referring to FIG. 1, FIG. 2 and FIG. 5, the pivot assembly 30 of the electronic device 100 in accordance with the preferred embodiment of the present invention is shown. The pivot assembly 30 is arranged on a middle of the long wall of the opening 12. Two opposite ends of the opening 12 which are seen from a rear view of the opening 12 and arranged transversely are defined as a left end and a right end of the opening 12. The pivot assembly 30 is arranged on inner portions of the left end and the right end of the opening 12, and two opposite ends of the pivot assembly 30 arranged on the left end and the right end of the opening 12 are symmetrical to each other with respect to a middle of the opening 12 located between the two opposite ends of the pivot assembly 30.

Referring to FIG. 2 to FIG. 5, the pivot assembly 30 includes a fixing base 31, a center shaft 33, a compression spring 35, two hollow abrasion proof pieces 34 and a pivot portion 21. The pivot portion 21 is correspondingly formed at one lateral margin of the lid 20, so that the lid 20 is connected with the case 10 by virtue of the pivot assembly 30 being pivoted to the pivot portion 21. The fixing base 31 is fastened on the long wall of the opening 12. The fixing base 31 is hollow. The fixing base 31 is connected with one side of a top of the lower fastening holder 13. The fixing base 31 has a receiving space 311 penetrating through a rear surface of the fixing base 31. The receiving space 311 of the fixing base 31 is equipped with an isolating board 32 protruded rearward. The isolating board 32 defines a fixing hole 32b transversely penetrating through the isolating board 32. A rear of the lid 20 has the pivot portion 21. The pivot portion 21 defines a pivoting hole 21a penetrating through an inner surface of the pivot portion 21. The pivoting hole 21a is in alignment with the fixing hole 32b.

The center shaft 33 is inserted into the fixing hole 32b and the pivoting hole 21a. Two opposite end surfaces 331 of the center shaft 33 are parallel to each other. The compression spring 35 is mounted around a middle of the center shaft 33.

The compression spring 35 is located between the isolating board 32 and the pivot portion 21. The two hollow abrasion proof pieces 34 are sleeved around the center shaft 33. The two abrasion proof pieces 34 are located between the isolating board 32 and the pivot portion 21. The compression spring 35 is located between the two abrasion proof pieces 34. Two opposite ends of the compression spring 35 abut against two inner surfaces of the two abrasion proof pieces 34. Two outer surfaces of the two abrasion proof pieces 34 opposite to the two inner surfaces of the two abrasion proof pieces 34 abut against the isolating board 32 and the pivot portion 21.

The fixing base 31 has a lacking groove 31a adjacent to the pivot portion 21. The lacking groove 31a is parallel to the isolating board 32. An outer surface of the isolating board 32 adjacent to the lacking groove 31a is recessed inward to form an indentation 32a. The indentation 32a is corresponding to the fixing hole 32b and the lacking groove 31a. The two abrasion proof pieces 34 include a first abrasion proof piece 34a mounted in the lacking groove 31a, and a second abrasion proof piece 34b mounted in the indentation 32a. A rear surface of the first abrasion proof piece 34a is recessed inward to form a first notch 34c for accommodating one end of the center shaft 33, a rear surface of the second abrasion proof piece 34b is recessed inward to form a second notch 34d for accommodating the other end of the center shaft 33. The fixing hole 32b is in alignment with middles of the first notch 34c and the second notch 34d. Two opposite ends of the center shaft 33 pass through the first notch 34c and the second notch 34d, and are inserted into the fixing hole 32b and the pivoting hole 21a. Inner surfaces of upper walls and lower walls of the first notch 34c of the first abrasion proof piece 34a and the second notch 34d of the second abrasion proof piece 34b are parallel. The center shaft 33 is clamped between and is fastened between the inner surfaces of the upper walls and the lower walls of the first notch 34c and the second notch 34d. Peripheries of the lacking groove 31a and the indentation 32a are shown as lying U shapes. Shapes and sizes of the lacking groove 31a and the indentation 32a are the same. Shapes and sizes of the first abrasion proof piece 34a and the second abrasion proof piece 34b are the same. Shapes and sizes of the first notch 34c and the second notch 34d are the same.

The pivot portion 21 abuts against an outer surface of the first abrasion proof piece 34a adjacent to the pivot portion 21. The isolating board 32 abuts against an outer surface of the second abrasion proof piece 34b adjacent to the isolating board 32. The two opposite ends of the compression spring 35 abut against two inner surfaces of the first abrasion proof piece 34a and the second abrasion proof piece 34b adjacent to the two opposite ends of the compression spring 35, the two opposite ends of the compression spring 35 are pressed against the two inner surfaces of the first abrasion proof piece 34a and the second abrasion proof piece 34b adjacent to the two opposite ends of the compression spring 35 to generate a corresponding friction force between the pivot portion 21 and the outer surface of the first abrasion proof piece 34a and a corresponding friction force between the isolating board 32 and the outer surface of the second abrasion proof piece 34b.

In the preferred embodiment, the pivot assembly 30 includes two center shafts 33 and two pivot portions 21. The receiving space 311 of the fixing base 31 is equipped with two isolating boards 32 protruded rearward. The two isolating boards 32 are clamped between two end walls of the fixing base 31. Each isolating board 32 defines the fixing hole 32b transversely penetrating through each isolating board 32. The lid 20 has a top wall 202, and a peripheral wall 203 extended downward from a periphery of the top wall 202. A middle of a bottom surface of the rear of the lid 20 is recessed inward to form a gap 204. The gap 204 is located between two opposite ends of the rear of the lid 20. The two opposite ends of the rear of the lid 20 are defined as the two pivot portions 21. A middle of a bottom surface of a rear of the peripheral wall 203 of the lid 20 is recessed inward to form the gap 204. Two opposite ends of the peripheral wall 203 are defined as the two pivot portions 21. The two pivot portions 21 define two pivoting holes 21a penetrating through inner surfaces of the two pivot portions 21. The two pivoting holes 21a are communicated with the gap 204. The two pivoting holes 21a are in alignment with the two fixing holes 32b of the two isolating boards 32.

When the two pivot portions 21 are assembled to and are pivoted to the fixing base 31, the fixing base 31 is received in the gap 204, and the two isolating boards 32 are clamped between the two pivot portions 21 of the lid 20, specifically, the two isolating boards 32 are clamped between the two pivot portions 21. The two pivoting holes 21a are corresponding to the two fixing holes 32b of the two isolating boards 32. The two pivoting holes 21a are aligned with middles of the two first notches 34c of the two first abrasion proof pieces 34a, middles of the two second notches 34d of the two second abrasion proof pieces 34b, and the two fixing holes 32b of the two isolating boards 32. The two center shafts 33 pass through the two pivoting holes 21a of the two pivot portions 21 and the two fixing holes 32b of the fixing base 31. Extending directions of the two center shafts 33 are parallel to the rear surface of the fixing base 31.

Two opposite end surfaces 331 of each center shaft 33 are parallel to each other. In order to further connect the lid 20 and the case 10, the two pivot portions 21 are symmetrical to each other with respect to the gap 204. The two pivot portions 21 are formed at the one lateral margin of the lid 20. The two center shafts 33 are inserted into the two fixing holes 32b and the two pivoting holes 21a, and the two opposite end surfaces 331 of each center shaft 33 are parallel to each other, the two opposite ends of the pivot assembly 30 arranged on the left end and the right end of the opening 12 are symmetrical to each other with respect to the middle of the opening 12 located between the two opposite ends of the pivot assembly 30, and the two pivot portions 21 are correspondingly formed at the one lateral margin of the lid 20, and the two pivot portions 21 are symmetrical to each other with respect to the gap 204, so that the lid 20 is connected with the case 10 by virtue of the pivot assembly 30 being pivoted to the two pivot portions 21.

Referring to FIG. 2 to FIG. 5, the fixing base 31 has two lacking grooves 31a recessed inward from rear surfaces of the two end walls of the fixing base 31. The two end walls of the fixing base 31 are clamped between the two pivot portions 21. The two end walls of the fixing base 31 are adjacent to inner ends of the two pivot portions 21, and the two lacking grooves 31a are adjacent to the inner ends of the two pivot portions 21. The two lacking grooves 31a are parallel to the two isolating boards 32. Outer surfaces of the two isolating boards 32 adjacent to the two lacking grooves 31a are recessed inward and away from the two end walls of the fixing base 31 to form two indentations 32a. The two indentations 32a are communicated with the two fixing holes 32b. The two indentations 32a are corresponding to the two fixing holes 32b and the two lacking grooves 31a. Preferably, peripheries of the two lacking grooves 31a and the two indentations 32a are shown as lying U shapes. Shapes of the two lacking grooves 31a and the two indentations 32a are the same. Sizes of the two lacking grooves 31a and the two indentations 32a are the same. Mouths of the two lacking grooves 31a and the two indentations 32a are towards the same direction. The mouths of the two lacking grooves 31a are corresponding to the mouths of the two indentations 32a. The mouths of the two lacking grooves 31a and the two indentations 32a are opposite to the accommodating space 11.

In the preferred embodiment, in order to further fasten the two center shafts 33, the pivot assembly 30 includes a plurality of spaced abrasion proof pieces 34 mounted in the fixing base 31. The plurality of the abrasion proof pieces 34 are sleeved around the two center shafts 33. The plurality of the abrasion proof pieces 34 are U-shaped, and middles of rears of the plurality of the abrasion proof pieces 34 are opened freely. Outer peripheries of the plurality of the abrasion proof pieces 34 are shown as the lying U shapes. The outer peripheries of the plurality of the abrasion proof pieces 34 are matched with the two lacking grooves 31a and the two indentations 32a. The plurality of the abrasion proof pieces 34 include two pairs of the abrasion proof pieces 34. Each pair of the abrasion proof pieces 34 are located between the one isolating board 32 and one pivot portion 21. Each compression spring 35 is located between one pair of the abrasion proof pieces 34. Two opposite ends of each compression spring 35 abut against two inner surfaces of the one pair of the abrasion proof pieces 34. Two outer surfaces of the one pair of the abrasion proof pieces 34 opposite to the two inner surfaces of the one pair of the abrasion proof pieces 34 abut against the one isolating board 32 and the one pivot portion 21.

The two pairs of the abrasion proof pieces 34 include two first abrasion proof pieces 34a and two second abrasion proof pieces 34b. Two abrasion proof pieces 34 are adjacent to each other, and the other two abrasion proof pieces 34 are adjacent to each other. The two second abrasion proof pieces 34b are located between the two first abrasion proof pieces 34a. One second abrasion proof piece 34b is adjacent to one first abrasion proof piece 34a. The other second abrasion proof piece 34b is adjacent to the other first abrasion proof piece 34a. Sizes of the two first abrasion proof pieces 34a and two second abrasion proof pieces 34b are the same. Shapes of the two first abrasion proof pieces 34a and two second abrasion proof pieces 34b are the same. The two first abrasion proof pieces 34a are mounted in the two lacking grooves 31a. The two second abrasion proof pieces 34b are mounted in the two indentations 32a. Rear surfaces of the two first abrasion proof pieces 34a are recessed inward to form two first notches 34c. Rear surfaces of the two second abrasion proof pieces 34b are recessed inward to form two second notches 34d. Sizes of the two first notches 34c of the two first abrasion proof pieces 34a and the two second notches 34d of the two second abrasion proof pieces 34b are the same. Shapes of the two first notches 34c of the two first abrasion proof pieces 34a and the two second notches 34d of the two second abrasion proof pieces 34b are the same.

Two opposite ends of each center shaft 33 are defined as a first end 332 inserted into one lacking groove 31a, and a second end 333 inserted into one fixing hole 32b facing the one lacking groove 31a. The first ends 332 of the two center shafts 33 are accommodated in the first notches 34c of the two first abrasion proof pieces 34a. The second ends 333 of the two center shafts 33 are accommodated in the second notches 34d of the two second abrasion proof pieces 34b. The two lacking grooves 31a, the first notches 34c of the two first abrasion proof pieces 34a and the second notches 34d of the two second abrasion proof pieces 34b face towards the same direction. The two lacking grooves 31a, the first notches 34c of the two first abrasion proof pieces 34a and the second notches 34d of the two second abrasion proof pieces 34b consistently face towards rearward and opposite to the accommodating space 11. The two fixing holes 32b of the two isolating boards 32 are in alignment with the middles of the first notches 34c of the two first abrasion proof pieces 34a and the middles of the second notches 34d of the two second abrasion proof pieces 34b.

The first ends 332 of the two center shafts 33 are positioned into the two first notches 34c of the two first abrasion proof pieces 34a, and then the second ends 333 of the two center shafts 33 are inserted into the two fixing holes 32b of the two isolating boards 32 through the two second notches 34d of the two second abrasion proof pieces 34b. The first ends 332 of the two center shafts 33 are inserted into the two pivoting holes 21a of the two pivot portions 21 through the two first notches 34c of the two first abrasion proof pieces 34a. Inner surfaces of upper walls and lower walls of the two first notches 34c of the two first abrasion proof pieces 34a and the two second notches 34d of the two second abrasion proof pieces 34b are parallel. The first ends 332 and the second ends 333 of the two center shafts 33 are clamped between and are fastened between the inner surfaces of the upper walls and the lower walls of the two first notches 34c of the two first abrasion proof pieces 34a and the two second notches 34d of the two second abrasion proof pieces 34b.

Top surfaces and bottom surfaces of the plurality of the abrasion proof pieces 34 are parallel. The top surfaces and the bottom surfaces of the plurality of the abrasion proof pieces 34 abut against inner surfaces of upper walls and lower walls of the two lacking grooves 31a and the two indentations 32a. A top surface and a bottom surface of each first abrasion proof piece 34a are parallel to each other. The top surface and the bottom surface of each first abrasion proof piece 34a abut against inner surfaces of an upper wall and a lower wall of the one lacking groove 31a. A top surface and a bottom surface of each second abrasion proof piece 34b are parallel to each other. The top surface and the bottom surface of each second abrasion proof piece 34b abut against inner surfaces of an upper wall and a lower wall of one indentation 32a.

Referring to FIG. 2 to FIG. 6, in order to lower a cost of the pivot assembly 30 and easily manufacture the pivot assembly 30, in the preferred embodiment, the pivot assembly 30 includes two compression springs 35. Each compression spring 25 is located between one isolating board 32, and the one pivot portion 21 adjacent to the one isolating board 32. The two compression springs 35 are mounted around the two center shafts 33. The two compression springs 35, the plurality of the abrasion proof pieces 34, the two isolating boards 32, the two end walls of the fixing base 31 and the two pivot portions 21 are concentric. Each compression spring 35 is mounted between the one first abrasion proof piece 34a and the one second abrasion proof piece 34b. The two first abrasion proof pieces 34a have two first abrasion proof surfaces 341, and the two second abrasion proof pieces 34b have two second abrasion proof surfaces 342. Two facing surfaces of the one first abrasion proof piece 34a and the one second abrasion proof piece 34b adjacent to two opposite ends of one compression spring 35 are defined as one first abrasion proof surface 341 and one second abrasion proof surface 342. Two facing surfaces of the other first abrasion proof piece 34a and the other second abrasion proof piece 34b adjacent to two opposite ends of the other compression spring 35 are defined as the other first abrasion proof surface 341 and the other second abrasion proof surface 342. Two outer surfaces of the two first abrasion proof pieces 34a adjacent to the two pivot portions 21 are defined as two third abrasion proof surfaces 343. Two surfaces of the two second abrasion proof pieces 34b adjacent to the two isolating boards 32 are defined as two fourth abrasion proof surfaces 344.

The one first abrasion proof surface 341 and one third abrasion proof surface 343 are two opposite surfaces of the one first abrasion proof piece 34a. The other first abrasion proof surface 341 and the other third abrasion proof surface 343 are two opposite surfaces of the other first abrasion proof piece 34a. The one second abrasion proof surface 342 and one fourth abrasion proof surface 344 are two opposite surfaces of the one second abrasion proof piece 34b. The other second abrasion proof surface 342 and the other fourth abrasion proof surface 344 are two opposite surfaces of the other second abrasion proof piece 34b.

Specifically, two opposite ends of each compression spring 35 abut against the one first abrasion proof surface 341 of the one first abrasion proof piece 34a and the one second abrasion proof surface 342 of the one second abrasion proof piece 34b. The two pivot portions 21 abut against the two third abrasion proof surfaces 343 of the two first abrasion proof pieces 34a, respectively. The two fourth abrasion proof surfaces 344 of the two second abrasion proof pieces 34b abut against inner walls of the two indentations 32a of the two isolating boards 32 facing the two end walls of the fixing base 31. The two opposite ends of the pivot assembly 30 arranged on the left end and the right end of the opening 12 are symmetrical to each other with respect to the middle of the opening 12 located between the two opposite ends of the pivot assembly 30, the plurality of the abrasion proof pieces 34 are accommodated in the two lacking grooves 31a and the two indentations 32a of the two two isolating boards 32, the two compression springs 35 are mounted around the two center shafts 33, the one compression spring 35 is fastened between two adjacent abrasion proof pieces 34 which are parallel to each other, and the other compression spring 35 is fastened between the other two adjacent abrasion proof pieces 34 which are parallel to each other.

In addition, when the lid 20 is lifted upward from the case 10 or is covered to the case 10, the two opposite ends of each compression spring 35 press against the one first abrasion proof surface 341 and the one second abrasion proof surface 342 of the one first abrasion proof piece 34a and the one second abrasion proof piece 34b of the two adjacent abrasion proof pieces 34, and the two third abrasion proof surfaces 343 and two fourth abrasion proof surfaces 344 of the two first abrasion proof pieces 34a and the two second abrasion proof pieces 34b of the plurality of the abrasion proof pieces 34 abut against the two pivot portions 21 and the two isolating boards 32 to generate corresponding friction forces among the two third abrasion proof surfaces 343, two fourth abrasion proof surfaces 344, the two compression springs 35, the two pivot portions 21 and the two isolating boards 32 to lower a speed of the lid 20 being lifted upward from or being covered to the case 10, so that a weight of the lid 20 is overcome to make the lid 20 lifted upward from the case 10 or is covered to the case 10 under the balance force. Each abrasion proof piece 34 has an abrasion proof function. The plurality of the abrasion proof pieces 34 are without rotating.

As described above, when the lid 20 is lifted upward from the case 10 or is covered to the case 10, in order to further avoid the plurality of the abrasion proof pieces 34 from rotating, a cross section of each abrasion proof piece 34 is arranged as is designed as a non-circular shape. Moreover, the plurality of the abrasion proof pieces 34 are U-shaped, the top surfaces and the bottom surfaces of the plurality of the abrasion proof pieces 34 are parallel, and the top surfaces and the bottom surfaces of the plurality of the abrasion proof pieces 34 abut against the inner surfaces of the upper walls and the lower walls of the two lacking grooves 31a and the two indentations 32a, so that when the two compression springs 35 abut against the plurality of the abrasion proof pieces 34, and the plurality of the abrasion proof pieces 34 abut against the two pivot portions 21 and the two isolating boards 32 to generate the corresponding friction forces among the plurality of the abrasion proof pieces 34, the two compression springs 35, the two pivot portions 21 and the two isolating boards 32, the plurality of the abrasion proof pieces 34 are without rotating. In addition, each abrasion proof piece 34 has the abrasion proof function, and the plurality of the abrasion proof pieces 34 are combined with designs of the two compression springs 35 to form resistances which are the friction forces. As a result, a cost of the pivot assembly 30 is lowered, and the pivot assembly 30 is miniaturized and is easy to be manufactured.

What is claimed is:

1. A pivot assembly, comprising:
a fixing base equipped with an isolating board, the isolating board defining a fixing hole transversely penetrating through the isolating board;
a pivot portion defining a pivoting hole penetrating through an inner surface of the pivot portion, the pivoting hole being in alignment with the fixing hole;
a center shaft inserted into the fixing hole and the pivoting hole, two opposite end surfaces of the center shaft being parallel to each other;
a compression spring mounted around the center shaft, the compression spring being located between the isolating board and the pivot portion; and
two hollow abrasion proof pieces sleeved around the center shaft, the two abrasion proof pieces being located between the isolating board and the pivot portion, the compression spring being located between the two abrasion proof pieces, two opposite ends of the compression spring abutting against two inner surfaces of the two abrasion proof pieces, two outer surfaces of the two abrasion proof pieces opposite to the two inner surfaces of the two abrasion proof pieces abutting against the isolating board and the pivot portion.

2. The pivot assembly as claimed in claim 1, wherein the fixing base has a lacking groove adjacent to the pivot portion, the lacking groove is parallel to the isolating board, an outer surface of the isolating board adjacent to the lacking groove is recessed inward to form an indentation corresponding to the fixing hole and the lacking groove, the two abrasion proof pieces include a first abrasion proof piece mounted in the lacking groove, and a second abrasion proof piece mounted in the indentation, a rear surface of the first abrasion proof piece is recessed inward to form a first notch for accommodating one end of the center shaft, a rear surface of the second abrasion proof piece is recessed inward to form a second notch for accommodating the other end of the center shaft, the fixing hole is in alignment with middles of the first notch and the second notch, two opposite ends of the center shaft pass through the first notch and the second notch and are inserted into the fixing hole and the pivoting hole, inner surfaces of upper walls and lower walls of the first notch and the second notch are parallel, the center shaft is clamped between and is fastened between the inner surfaces of the upper walls and the lower walls of the first notch and the second notch.

3. The pivot assembly as claimed in claim 2, wherein peripheries of the lacking groove and the indentation are shown as lying U shapes, shapes and sizes of the lacking groove and the indentation are the same, shapes and sizes of the first abrasion proof piece and the second abrasion proof piece are the same, shapes and sizes of the first notch and the second notch are the same.

4. The pivot assembly as claimed in claim 2, wherein the pivot portion abuts against an outer surface of the first abrasion proof piece adjacent to the pivot portion, the isolating board abuts against an outer surface of the second abrasion proof piece adjacent to the isolating board.

5. The pivot assembly as claimed in claim 4, wherein the two opposite ends of the compression spring abut against two inner surfaces of the first abrasion proof piece and the second abrasion proof piece adjacent to the two opposite ends of the compression spring, the two opposite ends of the compression spring are pressed against the two inner surfaces of the first abrasion proof piece and the second abrasion proof piece adjacent to the two opposite ends of the compression spring to generate a corresponding friction force between the pivot portion and the outer surface of the first abrasion proof piece and a corresponding friction force between the isolating board and the outer surface of the second abrasion proof piece.

6. The pivot assembly as claimed in claim 1, wherein the pivot assembly is applied to an electronic device which includes a case and a hollow lid, the case has an accommodating space, the case further has an opening connected between the accommodating space and an outside space, the pivot assembly is arranged on inner portions of a left end and a right end of the opening, and two opposite ends of the pivot assembly arranged on the left end and the right end of the opening are symmetrical to each other with respect to a middle of the opening located between the two opposite ends of the pivot assembly, the lid is pivoted to the case by virtue of the pivot assembly, the lid is mounted on a long wall of the opening, the pivot portion is correspondingly formed at one lateral margin of the lid, so that the lid is connected with the case by virtue of the pivot assembly being pivoted to the pivot portion.

7. A pivot assembly, comprising:
a fixing base equipped with two isolating boards protruded rearward, each isolating board defining a fixing hole transversely penetrating through each isolating board;
two pivot portions defining two pivoting holes penetrating through inner surfaces of the two pivot portions, the two pivoting holes being in alignment with the two fixing holes of the two isolating boards;
two center shafts passing through the two pivoting holes and the two fixing holes of the fixing base;
two compression springs mounted around the two center shafts, each compression spring being located between one isolating board, and one pivot portion adjacent to the one isolating board; and
two pairs of abrasion proof pieces sleeved around the two center shafts, each pair of the abrasion proof pieces being located between the one isolating board and the one pivot portion, each compression spring being located between one pair of the abrasion proof pieces, two opposite ends of each compression spring abutting against two inner surfaces of the one pair of the abrasion proof pieces, two outer surfaces of the one pair of the abrasion proof pieces opposite to the two inner surfaces of the one pair of the abrasion proof pieces abutting against the one isolating board and the one pivot portion.

8. The pivot assembly as claimed in claim 7, wherein the fixing base is hollow, the fixing base has two lacking grooves recessed inward from rear surfaces of two end walls of the fixing base, the two end walls of the fixing base are clamped between the two pivot portions, and the two lacking grooves are adjacent to inner ends of the two pivot portions, the two lacking grooves are parallel to the two isolating boards, outer surfaces of the two isolating boards adjacent to the two lacking grooves are recessed inward and away from the two end walls of the fixing base to form two indentations, the two indentations are communicated with the two fixing holes, the two indentations are corresponding to the two fixing holes and the two lacking grooves, the two pairs of the abrasion proof pieces include two first abrasion proof pieces, and two second abrasion proof pieces located between the two first abrasion proof pieces, the two first abrasion proof pieces are mounted in the two lacking grooves, the two second abrasion proof pieces are mounted in the two indentations, rear surfaces of the two first abrasion proof pieces are recessed inward to form two first notches, rear surfaces of the two second abrasion proof pieces are recessed inward to form two second notches, the two pivoting holes are aligned with middles of the two first notches, middles of the two second notches and the two fixing holes of the two isolating boards.

9. The pivot assembly as claimed in claim 8, wherein two opposite ends of each center shaft are defined as a first end and a second end, the second ends of the two center shafts are inserted into the two fixing holes through the two second notches, the first ends of the two center shafts are inserted into the two pivoting holes through the two first notches, inner surfaces of upper walls and lower walls of the two first notches and the two second notches are parallel, the first ends and the second ends of the two center shafts are clamped between and are fastened between the inner surfaces of the upper walls and the lower walls of the two first notches and the two second notches.

10. The pivot assembly as claimed in claim 8, wherein peripheries of the two lacking grooves and the two indentations are shown as lying U shapes, shapes of the two lacking grooves and the two indentations are the same, sizes of the two lacking grooves and the two indentations are the same, sizes of the two first abrasion proof pieces and two second abrasion proof pieces are the same, shapes of the two first abrasion proof pieces and two second abrasion proof pieces are the same, sizes of the two first notches and the two second notches are the same, shapes of the two first notches and the two second notches are the same.

11. The pivot assembly as claimed in claim 8, wherein two facing surfaces of one first abrasion proof piece and one second abrasion proof piece adjacent to two opposite ends of one compression spring are defined as one first abrasion proof surface and one second abrasion proof surface, two facing surfaces of the other first abrasion proof piece and the other second abrasion proof piece adjacent to two opposite ends of the other compression spring are defined as the other first abrasion proof surface and the other second abrasion proof surface, two outer surfaces of the two first abrasion proof pieces adjacent to the two pivot portions are defined as two third abrasion proof surfaces, two surfaces of the two second abrasion proof pieces adjacent to the two isolating boards are defined as two fourth abrasion proof surfaces, the two opposite ends of each compression spring abut against the one first abrasion proof surface of the one first abrasion proof piece and the one second abrasion proof surface of the one second abrasion proof piece, the two pivot portions abut against the two third abrasion proof surfaces of the two first abrasion proof pieces, the two fourth abrasion proof surfaces of the two second abrasion proof pieces abut against inner walls of the two indentations of the two isolating boards facing the two end walls of the fixing base.

12. The pivot assembly as claimed in claim 11, wherein the two opposite ends of each compression spring press against the one first abrasion proof surface and the one second abrasion proof surface of the one first abrasion proof piece and the one second abrasion proof piece, and the two third abrasion proof surfaces and two fourth abrasion proof surfaces of the two first abrasion proof pieces and the two second abrasion proof pieces abut against the two pivot portions and the two isolating boards to generate corresponding friction forces among the two third abrasion proof surfaces, two fourth abrasion proof surfaces, the two compression springs, the two pivot portions and the two isolating boards.

13. An electronic device, comprising:
a case;
a lid alternatively covered to the case or moved away from the case; and
a pivot assembly connected between the case and the lid, and the lid being pivoted to the case by virtue of the pivot assembly, the pivot assembly including
a fixing base equipped with two isolating boards protruded rearward, each isolating board defining a fixing hole transversely penetrating through each isolating board,
two pivot portions defining two pivoting holes penetrating through inner surfaces of the two pivot portions, the two pivoting holes being in alignment with the two fixing holes of the two isolating boards,
two center shafts passing through the two pivoting holes and the two fixing holes of the fixing base,
two compression springs mounted around the two center shafts, each compression spring being located between one isolating board, and one pivot portion adjacent to the one isolating board, and
two pairs of abrasion proof pieces sleeved around the two center shafts, each pair of the abrasion proof pieces being located between the one isolating board and the one pivot portion, each compression spring being located between one pair of the abrasion proof pieces, two opposite ends of each compression spring abutting against two inner surfaces of the one pair of the abrasion proof pieces, two outer surfaces of the one pair of the abrasion proof pieces opposite to the two inner surfaces of the one pair of the abrasion proof pieces abutting against the one isolating board and the one pivot portion.

14. The electronic device as claimed in claim 13, wherein the case has an accommodating space penetrating upward through a top of the case, the case further has an opening penetrating through a top surface of the case, the opening is located to and connected to a top of the accommodating space, the opening is connected between the accommodating space and an outside space, the pivot assembly is arranged on inner portions of a left end and a right end of the opening, and two opposite ends of the pivot assembly arranged on the left end and the right end of the opening are symmetrical to each other with respect to a middle of the opening located between the two opposite ends of the pivot assembly.

* * * * *